United States Patent
Chefd'hotel et al.

(10) Patent No.: US 7,300,398 B2
(45) Date of Patent: Nov. 27, 2007

(54) METHOD AND APPARATUS FOR REGISTRATION OF VIRTUAL ENDOSCOPIC IMAGES

(75) Inventors: Christophe Chefd'hotel, Princeton, NJ (US); Bernhard Geiger, Cranbury, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 548 days.

(21) Appl. No.: 10/915,501

(22) Filed: Aug. 9, 2004

(65) Prior Publication Data

US 2005/0048456 A1 Mar. 3, 2005

Related U.S. Application Data

(60) Provisional application No. 60/495,304, filed on Aug. 14, 2003.

(51) Int. Cl.
*A61B 1/00* (2006.01)
*A61B 1/04* (2006.01)
*G06K 9/00* (2006.01)

(52) U.S. Cl. .................. 600/117; 382/128
(58) Field of Classification Search .......... 434/267; 382/128; 600/117, 118, 139, 146
See application file for complete search history.

(56) References Cited

U.S. PATENT DOCUMENTS

| 5,891,030 A | | 4/1999 | Johnson et al. | |
|---|---|---|---|---|
| 5,920,319 A | * | 7/1999 | Vining et al. | 345/420 |
| 6,343,936 B1 | * | 2/2002 | Kaufman et al. | 434/262 |
| 6,496,188 B1 | * | 12/2002 | Deschamps et al. | 345/419 |
| 6,928,314 B1 | * | 8/2005 | Johnson et al. | 600/407 |
| 2003/0132936 A1 | * | 7/2003 | Kreeger et al. | 345/420 |
| 2007/0003131 A1 | * | 1/2007 | Kaufman | 382/154 |

OTHER PUBLICATIONS

Nain D et al, "Intra-Patient Prone to Supine Colon Registration for Synchronized Virtual Colonoscopy", Lecture Notes in Computer Science, MICCAI 2002, Tokyo, Conference Series on Medical Image Computing and Computer-Assisted Intervention, vol. 2489, Sep. 25, 2002, pp. 573-580.

Sundar H et al, "Skeleton Based Shape Matching and Retrieval", *Shape Modeling International 2003*, May 12-15, 2003; Piscataway, NJ USA, IEEE, May 12, 2003, pp. 130-290.

Search Report (including Notification of Transmittal of the International Search Report, International Search Report, and Written Opinion of the International Searching Authority).

* cited by examiner

*Primary Examiner*—John P. Leubecker
*Assistant Examiner*—Philip R Smith
(74) *Attorney, Agent, or Firm*—Donald B. Paschburg; F. Chau & Associates, LLC

(57) ABSTRACT

A method for registration of virtual endoscopy images in first and second patient positions comprises performing colon segmentation and feature extraction, including centerline and colon surface data for each of the images; resampling the centerline and colon surface data; computing respective local descriptors; pairing point correspondences on the centerlines between the first and second images by minimal cost matching; extrapolating the centerline point correspondences to a 3-dimensional/3-dimensional (3D/3D) transformation between the first and second images. The method also includes selecting a position for a virtual endoscope in one of the images; associating an orthogonal reference frame with the virtual endoscope; and applying the 3D/3D transformation to the orthogonal reference frame so as to derive a corresponding transformed reference frame for the virtual endoscope in the other of the images.

30 Claims, 4 Drawing Sheets

METHOD AND APPARATUS FOR REGISTRATION OF VIRTUAL ENDOSCOPIC IMAGES

CROSS-REFERENCE TO RELATED APPLICATIONS PRIORITY

Specific reference is hereby made to U.S. Provisional Application No. 60/495,304, entitled POINT SET MATCHING FOR PRONE-SUPINE REGISTRATION IN VIRTUAL ENDOSCOPY, filed Aug. 14, 2003 in the name of Christophe Chefd'hotel and Bernhard Geiger, the inventors in the present application, and of which the benefit of priority is claimed and whereof the disclosure is hereby incorporated herein by reference.

FIELD OF THE INVENTION

The present invention relates to the field of virtual endoscopy and, more particularly, to a method for automatically synchronizing views of volumetric images in virtual endoscopy, such as in virtual colonoscopy.

BACKGROUND OF THE INVENTION

Virtual colonoscopy (VC) refers to a method of diagnosis based on computer simulation of standard, minimally invasive endoscopic procedures using patient specific three-dimensional (3D) anatomic data sets. Examples of current endoscopic procedures include bronchoscopy, sinusoscopy, upper gastro-intestinal endoscopy, colonoscopy, cystoscopy, cardioscopy, and urethroscopy. VC visualization of non-invasively obtained patient specific anatomic structures avoids risks, such as perforation, infection, hemorrhage, and so forth, associated with real endoscopy, and provides the endoscopist with important information prior to performing an actual endoscopic examination. Such information and understanding can minimize procedural difficulties, decrease patient morbidity, enhance training and foster a better understanding of therapeutic results.

In virtual endoscopy, 3D images are created from two-dimensional (2D) computerized tomography (CT) or magnetic resonance (MR) data, for example, by volume rendering. Present-day CT and MRI scanners typically produce a set of cross-sectional images which, in combination, produce a set of volume data. These 3D images are created to simulate images coming from an actual endoscope, such as a fiber optic endoscope.

In the field of virtual endoscopy and, more particularly, in the field of virtual colonoscopy, it is desirable to provide for synchronization of different endoscopic views, such as views acquired in prone and supine positions of a patient. This facilitates the identification of features in the different views and facilitates, for example, the parallel study of prone and supine acquisitions in colon cancer screening.

Existing methods for synchronizing such views typically assume that a colon centerline is formed of a single connected component. See, for example, B. Acar, S. Napel, D. S. Paik, P. Li, J. Yee, C. F. Beaulieu, R. B. Jeffrey, *Registration of supine and prone ct colonography data: Method and evaluation*, Radiological Society of North America 87th Scientific Sessions, 2001; B. Acar, S. Napel, D. S. Paik, P. Li, J. Yee, R. B. Jeffrey, C. F. Beaulieu, *Medial axis registration of supine and prone CT colonography data*, Proceedings of 23rd Annual International Conference of the IEEE Engineering in Medicine and Biology Society (EMBC 2001), Istanbul, Turkey, 25-28 Oct. 2001; and D. Nain, S. Haker, W. E. L. Grimson, E. Cosman Jr, W. Wells, H. Ji, R. Kikinis, C.-F. Westin, *Intra-Patient Prone to Supine Colon Registration for Synchronized Virtual Colonoscopy*, In Proceedings of MICCAI 2002, Tokyo, Japan, September 2002.

BRIEF SUMMARY OF THE INVENTION

It is herein recognized that the assumption that a colon centerline is formed of a single connected component may not be an entirely valid assumption in various situations including, for example, the occurrence of partial occlusions which may result in cases of incomplete air insufflation and, for example, due to imperfect data segmentation.

It is an object of the present invention to provide a method facilitating parallel study of prone and supine acquisitions in applications such as colon cancer screening.

In accordance with an aspect of the present invention, a method is provided for automatically synchronizing endoscopic views of two volumetric images in virtual colonoscopy. In one aspect, the method utilizes optimal matching of two point sets, one for each volume of the respective volumetric images. These sets correspond to uniform samples of the colon centerline. Point correspondences are spatially extended to the entire data using a regularized radial basis function approximation.

In accordance with an aspect of the present invention, the method does not require an assumption that a colon centerline is formed of a single connected component. The method allows coping with partial occlusions, a situation often encountered in case of incomplete air insufflation or imperfect data segmentation.

In accordance with another embodiment, points are directly sampled on the colon surface.

In accordance with an embodiment of the present invention, two volumetric images are obtained using a colonoscopy protocol, including procedures such as bowel preparation and air insufflation. For each volume, a set of polygonal lines representing connected pieces of the colon centerline is made available. The distance from each point of the centerline to its closest point on the colon surface, otherwise herein also referred to as the colon radius, is considered to be known.

In accordance with an aspect of the present invention, a method for registration of, or between, virtual endoscopic images comprises deriving first and second volumetric images by an endoscopic protocol and representing the images by respective first and second volumetric image data sets; deriving respective centerline representations by connected line components; resampling the connected components to provide respective first and second sample sets; computing a descriptor for each sample; computing a similarity matrix using distances between the descriptors; and determining an optimal set of point correspondences between the first and second sample sets by application of a minimization algorithm to the similarity matrix.

In accordance with another aspect of the present invention, the step of deriving first and second volumetric images comprises a step of deriving the first and second volumetric images by a colonoscopy protocol.

In accordance with another aspect of the present invention, the step of deriving respective centerline representations comprises a step of deriving the respective centerline representations by connected polygonal line components; identifying a colon surface in each of the volumetric images; deriving respective colon radius information by determining the distance from each point of the centerline representation to a respectively closest point on the colon surface.

In accordance with another aspect of the present invention, a method comprises the steps of extrapolating the centerline point correspondences to a 3-dimensional/3-dimensional (3D/3D) transformation between the first and second volumetric images; and applying the 3D/3D transformation to transform a virtual endoscope position between the first and second volumetric images.

In accordance with another aspect of the present invention, a method for prone-supine registration of first and second volumetric images obtained by virtual colonoscopy and including respective centerline representations by connected polygonal line components and including respective colon radius information, comprises: resampling of the connected components to provide respective first and second centerline sample sets; computing a descriptor for each sample; computing a similarity matrix using distances between the descriptors; determining an optimal set of centerline point correspondences between the first and second sample sets by application of a minimization algorithm to the similarity matrix; extrapolating the centerline point correspondences to a 3D/3D transformation between the first and second volumetric images; and applying the 3D/3D transformation to transform a virtual endoscope position between the first and second volumetric images.

In accordance with another aspect of the present invention, a method for prone-supine registration of first and second volumetric images obtained by virtual colonoscopy represent by respective first and second volumetric datasets, including respective centerline representations by connected polygonal lines and including colon radius information, comprises resampling of the connected polygonal lines to provide respective first and second sample sets; computing a descriptor for each sample; computing a similarity matrix using distances between the descriptors; and determining an optimal set of point correspondences between the first and second sample sets by application of a minimization algorithm to the similarity matrix.

In accordance with another aspect of the present invention, method comprises the step of extrapolating the optimal set of centerline point correspondences to a 3D/3D transformation between the first and second volumetric images.

In accordance with another aspect of the present invention, the method comprises the step of applying the 3D/3D transformation to transform a virtual endoscope position between the first and second volumetric images.

In accordance with another aspect of the present invention, a method for registration between virtual endoscopy images in first and second patient positions, comprises performing colon segmentation and feature extraction, including centerline and colon surface data for each of the images; resampling the centerline and colon surface data; computing respective local descriptors; pairing point correspondences on the centerlines between the first and second images by minimal cost matching; extrapolating the centerline point correspondences to a 3D/3D transformation between the first and second images.

In accordance with another aspect of the present invention, a method for prone-supine registration of first and second volumetric images, obtained by virtual colonoscopy and represented by first and second volumetric image data sets, including respective centerline representations by connected polygonal line components, and including respective colon radius data, comprises resampling of the connected line components to provide respective first and second sample sets; computing, for each sample, a descriptor comprising a vector of geometric features and an estimated value of the colon radius data; computing a similarity matrix using distances between the descriptors; applying a minimization procedure to the similarity matrix to determine an optimal set of correspondences between points of the first and second sample sets by applying an algorithm to the similarity matrix for minimizing the sum of distances between all corresponding points; extrapolating the centerline point correspondences to a 3D/3D transformation between the first and second volumetric images; selecting a position for a virtual endoscope in one of the volumetric images; associating an orthogonal reference frame with the virtual endoscope; and applying the 3D/3D transformation to the orthogonal reference frame so as to derive a corresponding transformed reference frame for the virtual endoscope in the other of the volumetric images.

In accordance with another aspect of the present invention, a method for registration of virtual endoscopic images, the method comprises deriving first and second volumetric images by a colonoscopy protocol and representing the images by respective first and second volumetric image data sets; deriving respective centerline representations by connected polygonal line components; identifying a colon surface in each of the volumetric images; deriving respective colon radius information by determining the distance from each point of the centerline representation to a respectively closest point on the colon surface; resampling the connected components to provide respective first and second sample sets; computing a descriptor for each sample; computing a similarity matrix using distances between the descriptors; determining an optimal set of point correspondences between the first and second sample sets by application of a minimization algorithm to the similarity matrix.

In accordance with another aspect of the present invention, a method comprises extrapolating the centerline point correspondences to a 3D/3D transformation between the first and second volumetric images.

In accordance with another aspect of the present invention, a method comprises applying the 3D/3D transformation to transform a virtual endoscope position between the first and second volumetric images.

In accordance with another aspect of the present invention, apparatus for prone-supine registration of first and second volumetric images obtained by virtual colonoscopy and including respective centerline representations by connected polygonal line components and including respective colon radius information, comprises apparatus for resampling of the connected components to provide respective first and second centerline sample sets; apparatus for computing a descriptor for each sample; apparatus for computing a similarity matrix using distances between the descriptors; apparatus for determining an optimal set of centerline point correspondences between the first and second sample sets by application of a minimization algorithm to the similarity matrix; apparatus for extrapolating the centerline point correspondences to a 3D/3D transformation between the first and second volumetric images; and apparatus for applying the 3D/3D transformation to transform a virtual endoscope position between the first and second volumetric images.

In accordance with another aspect of the present invention, apparatus for registration of virtual endoscopic images, the apparatus comprises apparatus for deriving first and second volumetric images by an endoscopic protocol and representing the images by respective first and second volumetric image data sets; apparatus for deriving respective centerline representations by connected line components; apparatus for resampling the connected components to provide respective first and second sample sets; apparatus for computing a descriptor for each sample; apparatus for computing a similarity matrix using distances between the descriptors; and apparatus for determining an optimal set of point correspondences between the first and second sample sets by application of a minimization algorithm to the similarity matrix.

In accordance with another aspect of the present invention, a method for registration of virtual endoscopy images in first and second patient positions comprises performing colon segmentation and feature extraction, including centerline and colon surface data for each of the images; resampling the centerline and colon surface data; computing respective local descriptors; pairing point correspondences on the centerlines between the first and second images by minimal cost matching; extrapolating the centerline point correspondences to a 3D/3D transformation between the first and second images. The method also includes selecting a position for a virtual endoscope in one of the images; associating an orthogonal reference frame with the virtual endoscope; and applying the 3D/3D transformation to the orthogonal reference frame so as to derive a corresponding transformed reference frame for the virtual endoscope in the other of the images.

BRIEF DESCRIPTION OF THE DRAWINGS

These and other aspects of the invention will be more fully understood from the detailed description which follows, in conjunction with the drawings in which.

DETAILED DESCRIPTION OF THE INVENTION

Figure 1:
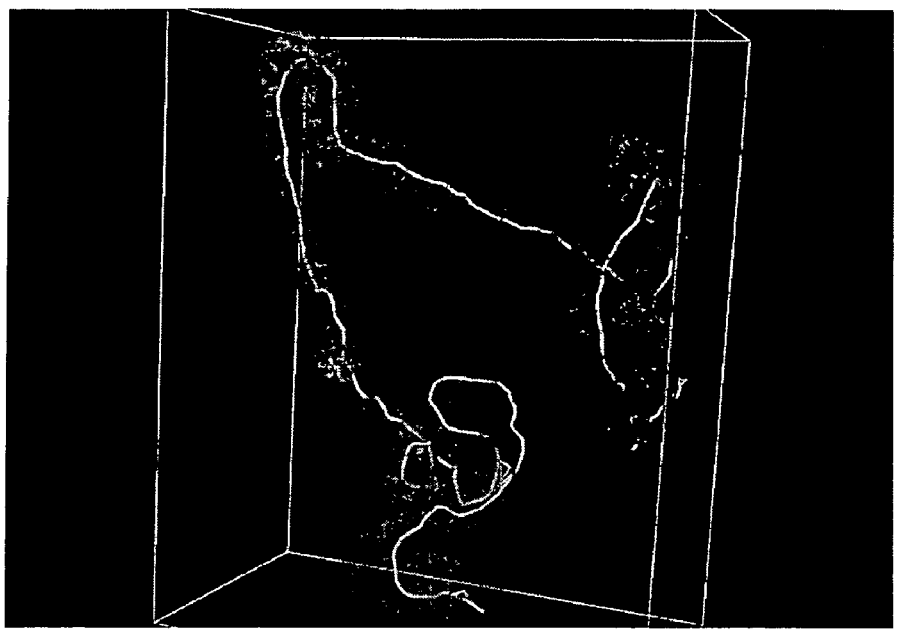
FIG. 1 shows a representation of a colon surface and its centerline, helpful to an understanding of the present invention.

FIG. 1 shows a representation of the colon surface and its centerline. The centerline is indicated as a lighter colored thread within the image of the colon.

In outline, an embodiment of the method in accordance with the present invention comprises a first step of computation of local shape descriptors. The computation comprises a uniform resampling of all connected centerline components and, for each sample, a computation of a multi-valued descriptor, using local shape properties.

The method comprises a further step of optimal point set matching, comprising computing of a similarity matrix using distances between descriptors and determining of optimal point correspondences using a matching algorithm for weighted bipartite graphs (optimal assignment problem).

Further steps in accordance with the invention comprise performing registration and synchronization of the endoscopic views, a radial basis function approximation being used to extrapolate centerline correspondences to a 3D/3D transformation between volumes and, in the virtual endoscopy user interface, the endoscope's position and orientation being updated using the resulting transformation.

Figure 2:
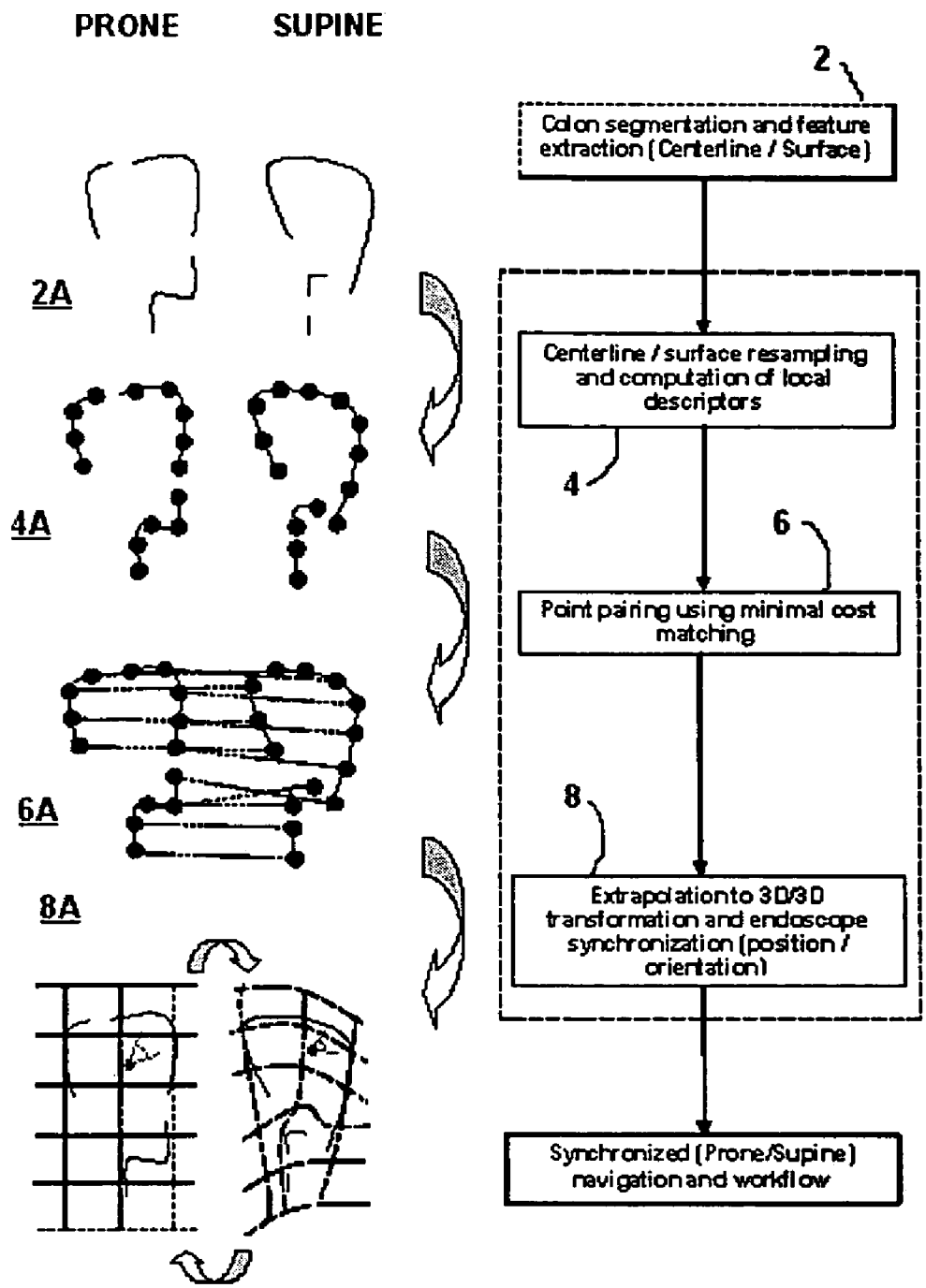
FIG. 2 shows a flow chart showing steps of an embodiment in accordance with the present invention.

FIG. 2, shows in relation to first and second subject positions, for example, prone and supine data, the steps of colon segmentation and feature extraction 2 (Centerline/ Surface); Centerline/surface resampling and computation of local descriptors 4; Point pairing using minimal cost matching 6; Extrapolation to 3D/3D transformation and endoscope synchronization (position/orientation); and Synchronized (Prone/Supine) navigation and workflow. FIG. 2 also shows a corresponding parallel graphical representation with juxtaposed prone and supine illustrations 2A-8A.

In further detail, the step of data resampling comprises selecting a fixed number N of sampling points. For each dataset, the total length of its centerline components is computed, that is, added up, and divided by N-1. Each connected component is then resampled such that the arclength between points corresponds to the previously computed value (Total Length/(N-1)). The position of new sample points is computed by linear interpolation.

Figure 3:
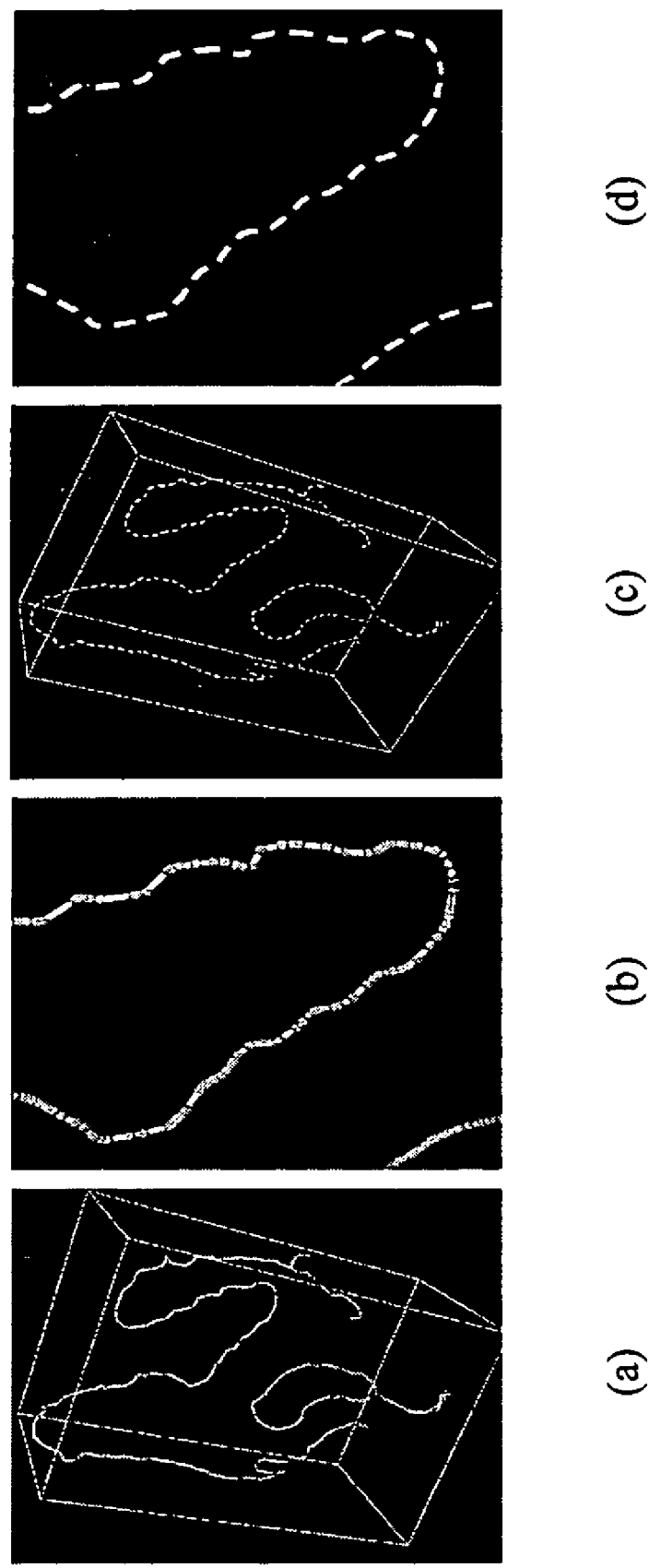
FIG. 3 shows uniform resampling of the centerline connected component in accordance with the present invention.

FIG. 3 shows uniform resampling of the centerline connected components: the original sampling is the solid line of FIG. 3($b$) while the darkest line of FIG. 3($d$) indicates the result after uniform resampling.

The step of descriptor computation is detailed next. A multi-valued descriptor is then computed for each sample point. This descriptor can be formed of the following attributes:

a vector of scalar geometric features (curvature, torsion, distance to centroid) as well as the estimated distance to the colon surface (colon radius); and a list of vectors containing the Euclidean distances and orientations from the current point to all the other samples (of the same dataset). Orientations can be computed in a local (Frenet) frame or using a global coordinate system.

For explanatory material on Frenet formulas, curvature, torsion and related matters, see for example, a mathematical textbook such Chapter 15 of "Advanced Engineering Mathematics," second edition, by Michael D. Greenberg; Prentice-Hall, Upper Saddle River, N.J.; 1998.

For the similarity matrix computation, an N×N_similarity matrix is built. It gives for each element of the first set a "distance" between its descriptor and the descriptors of all the elements of the second set. This distance between two descriptors is taken as the mean of distances between their corresponding attributes. It is noted that since distances between attributes may not have the same range, they are normalized before the mean is taken. Distances between scalar attributes are given by half of their squared differences and for vectors of Euclidean distances and orientations, the distance is evaluated using a statistical similarity measures, taking its opposite value and applying an offset if necessary. In order to compute statistical similarity measures between two vectors their elements are assumed to be samples of two random variables X and Y.

In accordance with aspects of the present invention, three possible strategies are described next.

(a) The vectors are rank ordered and Spearman's rank correlation is computed. For a detailed description of this technique see, for example, the publication by W. H. Press, S. A. Teukolsky, W. T. Vetterling, B. P. Flannery, *Numerical Recipes in C*, Second Edition, Cambridge University Press, 1992. The Spearman rank correlation coefficient is defined by $$r' \equiv 1 - 6 \sum \frac{d^2}{N(N^2 - 1)} \quad (1)$$

where $d_i$ is the difference in rank of the vectors' i-th element. The Spearman rank correlation coefficient provides a measure of the strength of the associations between two variables. For the Spearman rank correlation coefficient, see for example, CRC Concise Encyclopedia of Mathematics, Second Edition, Eric W. Weisstein; Chapman and Hall/CRC, New York, 2002; p. 2762 et seq.

(b) Histograms of the vector elements are computed and can be compared using the Kullback-Leibler divergence or the Chi-square measure. The Kullback-Leibler distance is defined as $$D(f_X \| f_Y) = \sum_x f_X(x) \log \frac{f_X(x)}{f_Y(x)} \qquad (2)$$

where $f_X$ and $f_Y$ represent the probabilities (normalized histograms) of the corresponding variables X and Y, respectively.

For the Kullback-Leibler divergence or distance, see for example, Mathematics Handbook for Science and Engineering, Råde and Westergren, Studentlitteratur Birkhäuser, Sweden, 1995; page 410.

The Chi-square measure is treated in mathematical texts; see for example, Applied Statistics for Engineers by William Volk, McGraw-Hill Book Company, Inc., New York, 1958; Chapter 5.

(c) The joint histogram of the two sets of vector elements is computed, and their similarity given by their Mutual Information. The Mutual Information is defined as $$I(X, Y) = \sum_x \sum_y f_{X,Y}(x, y) \log \frac{f_{X,Y}(x, y)}{f_X(x) f_Y(y)} \qquad (3)$$

Here, $f_{X,Y}(x,y)$ and $f_X(x)$, $f_Y(y)$ represent the joint and marginal probabilities of the pair of random variables (X,Y), respectively.

For the Mutual Information see, for example, the above-cited Mathematics Handbook for Science and Engineering, by Råde and Westergren, page 410 and the above-cited CRC Concise Encyclopedia of Mathematics by Weisstein.

With regard to bipartite graph matching, given the two sets of N points and the N×N similarity matrix, we try to find an optimal pairing (optimal assignment) which minimizes the sum of the distances between all corresponding points. This can be computed exactly using a weighted bipartite matching algorithm. A fast Augmenting Path technique can be applied to the similarity matrix previously obtained above, as described in the publication by R. Jonker, A. Volgenant, *A Shortest Augmenting Path Algorithm for Dense and Sparse Linear Assignment Problems*, Computing, 38:325-340, 1987.

Considering next the computation of the transformation, once a one-to-one correspondence is established between the two point sets, it is then used as a set of corresponding geometric landmarks. Landmark correspondences can be propagated to the entire space by computing two transformations (3D/3D mapping from the first volume to the second, and reciprocally) using a regularized radial basis function approximation. The regularization parameter is chosen empirically.

It is noted that the whole process: Descriptor computation, matching, computation of the transformation, can be iterated several times on updated version of the initial point sets.

The transformations can then be used to synchronize a prone and a supine view in the standard virtual colonoscopy workflow. The virtual endoscope is synchronized both in position and orientation using the following technique:

An infinitesimal orthogonal frame described by 4 points (one point for the origin and three for the basis vector extremities) is attached to the selected virtual endoscope. The transformation is applied to each point. The resulting frame, after orthogonalization, gives the corresponding endoscope position and orientation in the second dataset.

Figure 4:
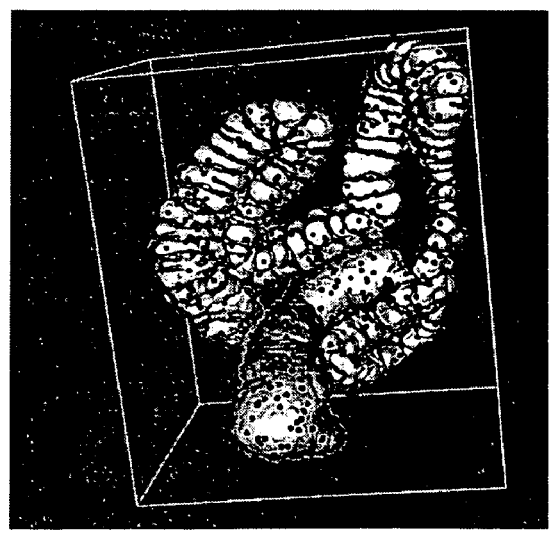
FIG. 4 shows surface uniform sampling in accordance with the present invention.

In another embodiment in accordance with the principles of the present invention, rather than using points on the centerline, one can also sample points uniformly on the surface of the colon. FIG. 4 shows surface uniform sampling in accordance with this approach.

The descriptor can be updated accordingly to include surface specific features (such as the Gaussian and Mean curvature of the colon surface at this point). The rest of the registration procedure would remain the same. The centerline is not needed in this case.

The shape context framework for the realignment of 2D curves as discussed in the publication by S. Belongie, J. Malik, J. Puzicha, *Shape Matching and Object Recognition Using Shape Context*, IEEE Transactions on Pattern Analysis and Machine Intelligence, (24) 24:509-522, 2002 is of interest relative to an aspect of the present invention. However, it differs significantly for the 1D matching approaches (warping based on dynamic programming, linear stretching/shrinking along the centerline path) previously used to perform intra-patient registration of prone and supine data in virtual colonoscopy. See also the two above-cited publications by Acar et al., *Registration of supine and prone ct colonography data: Method and evaluation, and Medial axis registration of supine and prone CT colonography data*; and the above-cited publication by Nain et al.

Figure 5:
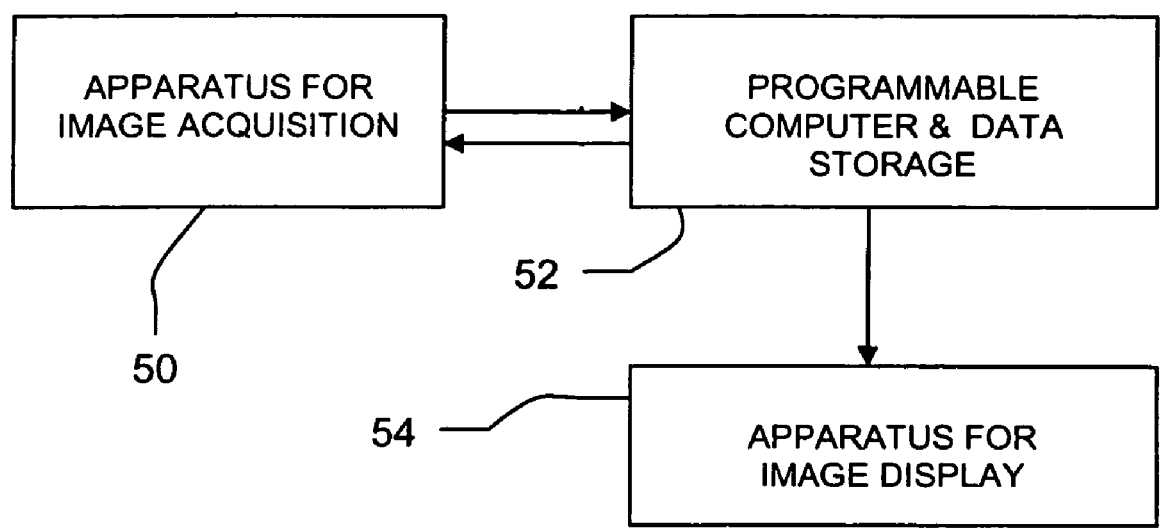
FIG. 5 shows a block diagram of apparatus suitable for practicing the present invention.

It will be understood that the present invention is intended to be practiced in conjunction with a programmable computer. FIG. 5 shows a block diagram of apparatus suitable for practicing the present invention. Images are acquired by apparatus for image acquisition 50, as known in the art, in accordance with a protocol as earlier described. Such images, conveniently in digitized form, are stored and processed by a computer 52, in accordance with principles of the present invention. Processed images are viewable on image display apparatus 54, as known in the art, and may be further stored, processed, and/or transmitted by known communications techniques.

The invention has been described by way of exemplary embodiments. It will be apparent to one of ordinary skill in the art to which the present invention pertains that various changes and substitutions may be made without departing from the spirit of the invention.

These and like changes and substitutions are intended to be within the scope of the claims following.

What is claimed is:

1. A method for registration of virtual endoscopic images, said method comprising:
    deriving first and second volumetric images by an endoscopic protocol and representing said images by respective first and second volumetric image data sets;
    deriving respective centerline representations by connected line components;

resampling said connected line components to provide respective first and second sample sets;

computing a descriptor for each sample set;

computing a similarity matrix using distances between said descriptors; and determining an optimal set of point correspondences between said first and second sample sets by application of a minimization algorithm to said similarity matrix, wherein said step of resampling comprises:

selecting a number N of sampling points on said respective connected line components;

computing a length of said connected line components;

dividing said length by N−1 to derive a computed value; and resampling each of said connected line components at respective new sampling points such that an arc-length between said new sampling points corresponds to said computed value.

2. A method as recited in claim 1, wherein said step of deriving first and second volumetric images comprises a step of deriving said first and second volumetric images by a colonoscopy protocol.

3. A method as recited in claim 1, wherein said step of deriving respective centerline representations comprises:

a step of deriving said respective centerline representations by connected line components;

identifying a colon surface in each of said volumetric images; and deriving respective colon radius information by determining the distance from each point of said centerline representation to a respectively closest point on said colon surface.

4. A method as recited in claim 1, comprising the steps of:

extrapolating said centerline point correspondences to a 3-dimensional/3-dimensional (3D/3D) transformation between said first and second volumetric images; and applying said 3D/3D transformation to transform a virtual endoscope position between said first and second volumetric images.

5. A method for registration of virtual endoscopy images in first and second patient positions, said method comprising:

performing colon segmentation and feature extraction, including centerline and colon surface data for each of said images;

resampling said centerline and colon surface data;

computing respective local descriptors;

pairing point correspondences on said centerlines between said first and second images by minimal cost marching; and extrapolating said centerline point correspondences to a 3-dimensional/3-dimensional (3D/3D) transformation between said first and second images;

wherein said step of performing colon segmentation comprises deriving respective centerline representations by connected polygonal line components, wherein said step of resampling comprises:

selecting a fixed number N of sampling points on said respective connected polygonal line components;

computing the total sum length of said connected polygonal line components;

dividing said total sum length by (N−1) to derive a computed value; and resampling each of said connected polygonal line components at respective new sampling points such that an arc length between said new sampling points corresponds to said value, said new sampling points having positions determined by linear interpolation.

6. A method as recited in claim 5, comprising:

selecting a position for a virtual endoscope in one of said images;

associating an orthogonal reference frame with said virtual endoscope; and applying said 3D/3D transformation to said orthogonal reference frame so as to derive a corresponding transformed reference frame for said virtual endoscope in the other of said images.

7. A method as recited in claim 5, wherein said step of computing respective local descriptors comprises:

computing said respective descriptors as a vector of scalar geometric features and an estimated distance to a colon surface, utilizing said colon radius data at each of said new sampling points.

8. A method as recited in claim 7, wherein said step of computing respective local descriptors comprises:

computing said geometric features to include curvature, torsion, and distance to a centroid at each of said new sampling points.

9. A method as recited in claim 7, wherein said step of computing local descriptors comprises:

computing a list of vectors containing Euclidean distances and orientations from each of said new sampling points to all other ones of said new sampling points of the same one of said datasets.

10. A method as recited in claim 9, wherein said step of computing a list of vectors comprises computing said orientations relative to a local, Frenet type, coordinate frame.

11. A method as recited in claim 9, wherein said step of computing a list of vectors comprises computing said orientations relative to a global coordinate system.

12. A method for registration of virtual endoscopy images in first and second patient positions, said method comprising:

performing colon segmentation and feature extraction, including centerline and colon surface data for each of said images;

resampling said centerline and colon surface data;

computing respective local descriptors;

pairing point correspondences on said centerlines between said first and second images by minimal cost matching; and extrapolating said centerline point correspondences to a 3-dimensional/3-dimensional (3D/3D) transformation between said first and second images, wherein said step of pairing point correspondences on said centerlines comprises computing a similarity matrix by constructing an N×N similarity matrix giving for each sample of said first sample set a distance measure between the descriptor for said each sample and descriptors of all samples of said second sample set, wherein said distance measure between any two of said descriptors is computed as one of (a) the mean and (b) the median of a normalized distance between corresponding attributes of said any two of said descriptors, wherein (A) in the ease of scalar attributes, half of the squared difference between said scalar attributes, and (B) in the case of vectors of Euclidean distances and orientations, a distance evaluated using a statistical similarity measure, wherein step (B) comprises one of the following:
(c) rank ordering said vectors and computing Spearman's rank correlation,
(d) computing histograms of elements of said vectors and comparing said elements using one of (C) Kullback-Leibler divergence and (D) Chi-square measure, and
(e) computing a joint histogram of two respective sets of elements of two vectors and computing their similarity by the Mutual Information of said two respective sets.

13. A method for registration of virtual endoscopy images in first and second patient positions, said method comprising:
performing colon segmentation and feature extraction, including centerline and colon surface data for each of said images;
resampling said centerline and colon surface data;
computing respective local descriptors;
pairing point correspondences on said centerlines between said first and second images by minimal cost matching; and
extrapolating said centerline point correspondences to a 3-dimensional/3-dimensional (3D/3D) transformation between said first and second images,
wherein said step of extrapolating said centerline point correspondences to a first 3D/3D transformation between said first and second volumetric images and a second 3D/3D transformation between said second and said first volumetric images, reciprocal to said first 3D/3D transformation by utilizing a regularized radial basis function approximation.

14. A method as recited in claim 13, wherein said step of pairing point correspondences on said centerlines between said first and second images by minimal cost matching comprises:
determining an optimal assignment that minimizes the sum of distances between all corresponding points by applying a bipartite matching algorithm.

15. A method as recited in claim 14, wherein said step of applying a minimization procedure comprises applying a fast Augmenting Path technique to said similarity matrix.

16. A method as recited in claim 13, comprising empirically choosing a regularization parameter for said regularized radial basis function approximation.

17. A method as recited in claim 13, wherein said step of associating an orthogonal reference frame with said virtual endoscope comprises associating with said virtual endoscope an infinitesimal orthogonal frame with a point of origin and three respective points, one for the extremity of each of three basis vectors; and
applying said 3D/3D transformation to each of said points so as to derive said corresponding transformed reference frame for said virtual endoscope.

18. A method for prone-supine registration of first and second volumetric images, obtained by virtual colonoscopy and represented by first and second volumetric image data sets, including respective centerline representations by connected polygonal line components, and including respective colon radius data, said method comprising:
resampling of said connected line components to provide respective first and second sample sets;
computing, for each sample, a descriptor comprising a vector of geometric features and an estimated value of said colon radius data;
computing a similarity matrix using distances between said descriptors;
applying a minimization procedure to said similarity matrix to determine an optimal set of correspondences between points of said first and second sample sets by applying an algorithm to said similarity matrix for minimizing the sum of distances between all corresponding points;
extrapolating said centerline point correspondences to a 3-dimensional/3-dimensional (3D/3D) transformation between said first and second volumetric images;
selecting a position for a virtual endoscope in one of said volumetric images;
associating an orthogonal reference frame with said virtual endoscope; and
applying said 3D/3D transformation to said orthogonal reference frame so as to derive a corresponding transformed reference frame for said virtual endoscope in the other of said volumetric images,
wherein said seep of resampling comprises:
selecting a fixed number N of sampling points on said respective connected polygonal line components;
computing the total sum length of said connected polygonal line components;
dividing said total sum length by (N-1) to derive a computed value; and
resampling each of said connected polygonal line components at respective new sampling points such that an arc length between said new sampling points corresponds to said value, said new sampling points having positions determined by linear interpolation.

19. A method as recited in claim 18, wherein said step of computing respective descriptors comprises:
computing said respective descriptors as a vector of scalar geometric features and an estimated distance to a colon surface, utilizing said colon radius data at each of said new sampling points.

20. A method as recited in claim 19, wherein said step of computing respective descriptors comprises:
computing said geometric features to include curvature, torsion, and distance to a centroid at each of said new sampling points.

21. A method for prone-supine registration of first and second volumetric images, obtained by virtual colonoscopy and represented by first and second volumetric image data sets, including respective centerline representations by connected polygonal line components, and including respective colon radius data, said method comprising:
resampling of said connected line components to provide respective first and second sample sets;
computing, for each sample, a descriptor comprising a vector of geometric features and an estimated value of said colon radius data;
computing a similarity matrix using distances between said descriptors;
applying a minimization procedure to said similarity matrix to determine an optimal set of correspondences between points of said first and second sample sets by applying an algorithm to said similarity matrix for minimizing the sum of distances between all corresponding points;
extrapolating said centerline point correspondences to a 3-dimensional/3-dimensional (3D/3D) transformation between said first and second volumetric images;
selecting a position for a virtual endoscope in one of said volumetric images;
associating an orthogonal reference frame with said virtual endoscope; and
applying said 3D/3D transformation to said orthogonal reference frame so as to derive a corresponding transformed reference frame for said virtual endoscope in the other of said volumetric images, wherein said step of computing respective descriptors comprises:

computing a list of vectors containing Euclidean distances and orientations from each of said new sampling points to all other ones of said new sampling points of the same one of said datasets.

22. A method as recited in claim 21, wherein said step of computing a list of vectors comprises computing said orientations relative to a local, Frenet type, coordinate frame.

23. A method as recited in claim 21, wherein said step of computing a list of vectors comprises computing said orientations relative to a global coordinate system.

24. A method for prone-supine registration of first and second volumetric images, obtained by virtual colonoscopy and represented by first and second volumetric image data sets, including respective centerline representations by connected polygonal line components, and including respective colon radius data, said method comprising:

resampling of said connected line components to provide respective first and second sample sets;

computing, for each sample, a descriptor comprising a vector of geometric features and an estimated value of said colon radius data;

computing a similarity matrix using distances between said descriptors;

applying a minimization procedure to said similarity matrix to determine an optimal set of correspondences between points of said first and second sample sets by applying an algorithm to said similarity matrix for minimizing the sum of distances between all corresponding points;

extrapolating said centerline point correspondences to a 3-dimensional/3-dimensional (3D/3D) transformation between said first and second volumetric images;

selecting a position for a virtual endoscope in one of said volumetric images;

associating an orthogonal reference frame with said virtual endoscope; and applying said 3D/3D transformation to said orthogonal reference frame so as to derive a corresponding transformed reference frame for said virtual endoscope in the other of said volumetric images, wherein said step of computing a similarity matrix comprises:

constructing an N×N similarity matrix giving for each sample of said first sample set a distance measure between the descriptor for said each sample and descriptors of all samples of said second sample set, wherein said distance measure between any two of said descriptors is computed as one of (a) the mean and (b) the median of a normalized distance between corresponding attributes of said any two of said descriptors, wherein (A) in the case of scalar attributes, the absolute value of the difference between said scalar attributes, and (B) in the case of vectors of Euclidean distances and orientations, a distance evaluated using a statistical similarity measure, wherein step (B) comprises one of the following:

(c) rank ordering said vectors and computing Spearman's rank correlation, (d) computing histograms of elements of said vectors and comparing said elements using one of (C) Kullback-Leibler divergence and (D) Chi-square measure, and (e) computing a joint histogram of two respective sets of elements of two vectors and computing their similarity by the Mutual Information of said two respective sets.

25. A method for prone-supine registration of first and second volumetric images, obtained by virtual colonoscopy and represented by first and second volumetric image data sets, including respective centerline representations by connected polygonal line components, and including respective colon radius data, said method comprising:

resampling of said connected line components to provide respective first and second sample sets;

computing, for each sample, a descriptor comprising a vector of geometric features and an estimated value of said colon radius data;

computing a similarity matrix using distances between said descriptors;

applying a minimization procedure to said similarity matrix to determine an optimal set of correspondences between points of said first and second sample sets by applying an algorithm to said similarity matrix for minimizing the sum of distances between all corresponding points;

extrapolating said centerline point correspondences to a 3-dimensional/3-dimensional (3D/3D) transformation between said first and second volumetric images;

selecting a position for a virtual endoscope in one of said volumetric images;

associating an orthogonal reference frame with said virtual endoscope; and applying said 3D/3D transformation to said orthogonal reference frame so as to derive a corresponding transformed reference frame for said virtual endoscope in the other of said volumetric images, wherein said step of extrapolating said centerline point correspondences to a first 3D/3D transformation between said first and second volumetric images and a second 3D/3D transformation between said second and said first volumetric images, reciprocal to said first 3D/3D transformation by utilizing a regularized radial basis function approximation.

26. A method as recited in claim 25, wherein said step of applying a minimization procedure comprises: determining an optimal assignment that minimizes the sum of distances between all corresponding points by applying a bipartite matching algorithm.

27. A method as recited in claim 26, wherein said step of applying a minimization procedure comprises applying a fast Augmenting Path technique to said similarity matrix.

28. A method as recited in claim 25, comprising empirically choosing a regularization parameter for said regularized radial basis function approximation.

29. A method as recited in claim 25, wherein said step of associating an orthogonal reference frame with said virtual endoscope comprises associating with said virtual endoscope an infinitesimal orthogonal frame with a point of origin and three respective points, one for the extremity of each of three basis vectors; and applying said 3D/3D transformation to each of said points so as to derive said corresponding transformed reference frame for said virtual endoscope.

30. Apparatus for registration of virtual endoscopic images, said apparatus comprising:

means for deriving first and second volumetric images by an endoscopic protocol and representing said images by respective first and second volumetric image data sets;

means for deriving respective centerline representations by connected line components;

means for resampling said connected line components to provide respective first and second sample sets, wherein the means for resampling comprises:
  means for selecting a number N of sampling points on said respective connected line components;
  means for computing a length of said connected line components;
  means for dividing said length by N−1 to derive a computed value; and
  means for resampling each of said connected line components at respective new sampling points such that an arc-length between said new sampling points corresponds to said computed value;
means for computing a descriptor for each sample set;
means for computing a similarity matrix using distances between said descriptors; and
means for determining an optimal set of point correspondences between said first and second sample sets by application of a minimization algorithm to said similarity matrix.

* * * * *